United States Patent [19]

Watanabe et al.

[11] Patent Number: 4,947,266

[45] Date of Patent: Aug. 7, 1990

[54] IMAGE PROCESSING SYSTEM

[75] Inventors: Yutaka Watanabe; Masaaki Ito; Hideaki Kusano, all of Osaka, Japan

[73] Assignee: Minolta Camera Kabushiki Kaisha, Osaka, Japan

[21] Appl. No.: 256,637

[22] Filed: Oct. 12, 1988

[30] Foreign Application Priority Data

Oct. 13, 1987 [JP] Japan .................................. 62-257888
Oct. 13, 1987 [JP] Japan .................................. 62-257889
Oct. 13, 1987 [JP] Japan .................................. 62-257890

[51] Int. Cl.⁵ .............................................. H04N 1/00
[52] U.S. Cl. ..................................... 358/408; 358/498; 358/400; 355/323; 355/313
[58] Field of Search ............... 358/256, 280, 285, 400, 358/404, 443, 474, 498, 408; 355/323, 313, 317

[56] References Cited

U.S. PATENT DOCUMENTS

| | | | |
|---|---|---|---|
| 4,110,794 | 8/1978 | Lester et al. | 355/3 R |
| 4,182,568 | 1/1980 | Levine | 355/8 |
| 4,439,865 | 3/1984 | Kikuchi et al. | 355/323 |
| 4,502,776 | 3/1985 | Matsumoto et al. | 355/323 |
| 4,527,885 | 7/1985 | Ayata et al. | 358/256 |
| 4,751,550 | 6/1988 | Murakami | 355/323 |
| 4,757,356 | 7/1988 | Garofalo | 355/323 |
| 4,791,492 | 12/1988 | Nagaohima et al. | 358/256 |
| 4,797,706 | 1/1989 | Sugishima et al. | 358/256 |

Primary Examiner—Howard W. Britton
Assistant Examiner—Kim Yen Vu
Attorney, Agent, or Firm—Burns, Doane, Swecker & Mathis

[57] ABSTRACT

This invention concerns an image processing system whichis constructed by combining a plurality of image readers for electrically reading an image and producing corresponding image data and printing means provided with sorting means for sorting and stowing sheets carrying formed images into a plurality of discharge paper bins and adapted to form an image on sheets based on said image data received from said image readers. In accordance with this image processing system, the operator is enabled to associate a given sheet bearing an image formed in accordance with an image signal read out by any of the image readers with the particular image reader which has produced the image signal as the source of the image on the sheet. The image processing system, therefore, enhances the efficiency of the operator's work in a great measure.

21 Claims, 16 Drawing Sheets

4,947,266

IMAGE PROCESSING SYSTEM

BACKGROUND OF THE INVENTION

1. Field of the Invention:

This invention relates to an image processing system constructed by combining a plurality of image readers such as, for example, microfilm readers and a printing means such as, for example, a laser beam printer. More particularly this invention relates to an image processing system so constructed as to improve the efficiency of the operator's work.

2. Description of the Related Art:

In consequence of the recent remarkable advances in the field of image processing technique, for example, the Charge Coupled Device for transforming a discerned image into an electric signal, i.e. the image scanner making use of the so-called CCD, for example, has been enjoying a notable improvement in performance. One typical use to be found for the image scanner is in a microfilm reader which serves the purpose of reading images recorded on a microfilm.

The microfilm reader was primarily intended as a means for causing image data recorded on a microfilm to be projected on a screen in order for the operator thereof to acquire visual knowledge of the image data. From long ago, the desirability of allowing the image data to be preserved also on recording papers as occasion demands has found approval. In the specification of Japanese Patent Application disclosure SHO No. 62(1987)-5,764, an invention aimed at meeting this demand is disclosed which relates to a copying system constructed by combining one microfilm reader and one printing means for producing images read out by the microfilm reader on recording papers or effecting transfer of image data from the microfilm to the recording papers. By this copying system, the image data read out by the image reader such as, for example, the microfilm reader can be recorded for preservation on recording papers through the medium of the printing means.

When the copying system is constructed by combining one image reader and one printing means as has been heretofore practised, adoption of a plurality of image readers inevitably necessitates installation of as many printing means. Incidentally, a printing means generally takes up a wide floor area and costs very dearly. From the standpoint of the economy of both floor space and expense, the adoption of a plurality of printing means has posed a serious problem.

The inventor, therefore, has taken notice of the problem and the fact that even when a plurality of image readers are installed, all these image readers are not always kept in operation and has consequently invented an image processing system constructed by combining a plurality of image readers and a smaller number of printing means.

This invention is indeed advantageous in terms of economy of floor space and cost. Since this system is destined to necessitate connection of a plurality of image readers to one printing means, however, it inevitably entails as a new problem the possibility that there will arise confusion about the association of recording papers having images already printed thereon with image readers having produced image signals as sources of the images on the recording papers.

SUMMARY OF THE INVENTION

In an image processing system comprising plurality of image readers and printing means provided with sorting means and connected to the image readers, this invention has as a main object thereof the provision of an image processing system so configured as to enable the operator to associate as given sheet bearing an image formed in accordance with an image signal read out by any of the image readers with the particular image reader which has produced the image signal as the source of the image on the sheet.

Another object of this invention is to provide an image processing system which is capable of enhancing the efficiency of the operator's work.

Now, a typical image processing system as one embodiment of this invention will be described below as applied to an operation using microfilm readers (hereinafter referred to simply as "scanners") as image readers and a laser beam printer (hereinafter referred to simply as "LBP") as a printing means, with reference to the accompanying drawings.

DESCRIPTION OF THE PREFERRED EMBODIMENTS

Figure 2:
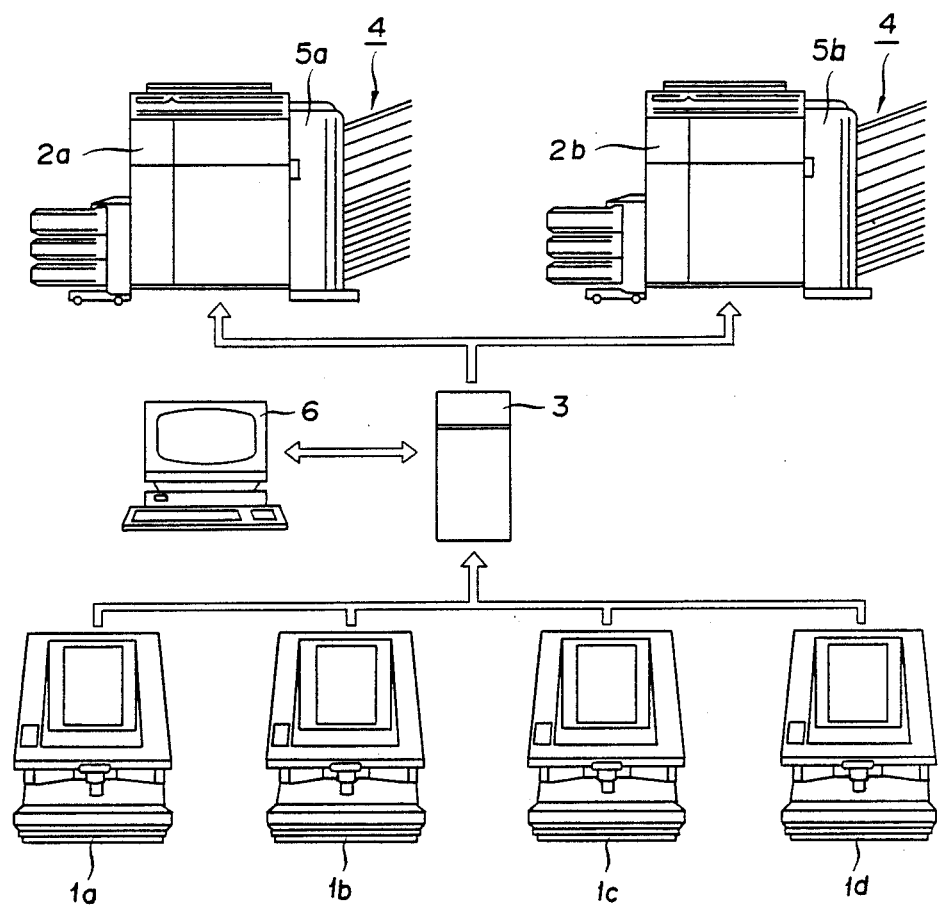
FIG. 2 is a schematic structural diagram of the system mentioned above.

As illustrated in FIG. 2, the image processing system of the present embodiment is composed of four scanners 1a to 1d, two LBP's 2a and 2b, and one control means (hereinafter referred to as "controller") connected to the scanners 1a to 1d and the LBP's 2a and 2b and adapted to establish selective connection between the scanners 1a to 1d and the LBP's 2a and 2b.

The scanners 1a to 1d serve the purpose of transforming microfilm images into electric signals (image data) through the medium of an imaging device such as CCD. The LBP's 2a and 2b modulate laser beams in accordance with the incident image data, forming latent images conforming to the image data on a sensitive material, and developing latent images to obtain visual images, and transferring the developed images to a recording paper from the sensitive material.

To the LBP's 2a and 2b, connected respectively thereto are discharge paper bin sorters 5a and 5b which sort recording papers used and released from the LBP's 2a and 2b based on a command issued by a controller 3 and accordingly distribute them to a plurality of discharge paper bins 4. Now, the sorting operation normally carried out by the discharge bin sorters 5a and 5b will be described below as applied, for example, to an operation for producing 10 sets of recorded image data, each from five pages of image data. Two methods are available for this operation. In one method, the operation is performed so as to produce 10 sets each of five pages of recording paper by the use of 10 discharge paper bins 4 and, in the other method called grouping, the operation is accomplished by apportion as many pages of recording paper to give discharge paper bins.

To the controller 3 is connected an external computer 6 which externally issues various commands to the system. The present embodiment has been described as one having four scanners and two LBP's connected to one controller. The relative quantities mentioned are not critical. It suffices for this invention to have a plurality of scanners and a smaller number of LBP's than the scanners connected to one controller.

Figure 3:
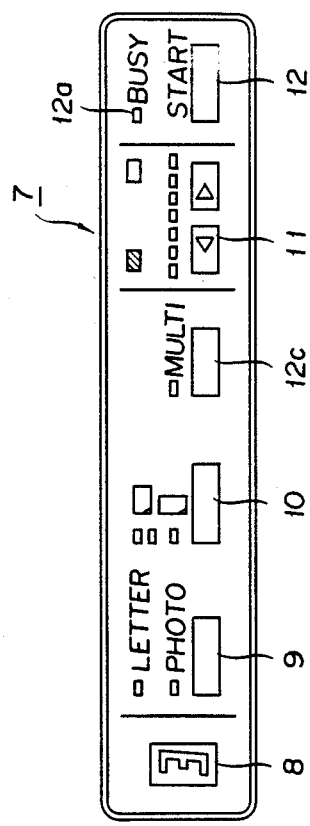
FIG. 3 is a diagram illustrating a control panel of the scanner.

FIG. 3 illustrates a control panel 7 which is provided for each of the scanners 1a to 1d. Now, the control panel 7 which is disposed on the scanner 1a will be described below as representative of all the control panels used herein.

As illustrated in the diagram, on the control panel 7 disposed on the scanner 1a, there are laid out an indicator 8 for displaying the number of bins to which the recording papers formed with images based upon outputs of the image data from the scanner 1a are to be discharged, an image mode selection switch 9 for selecting a particular mode of images to be read out, a scan size selection switch 10 for selecting a particular size of images to be read out, an exposure level selection switch 11 for selecting a particular exposure level of images to be read out, a start switch 12 for commanding the actuation of the scanner, a busy LED 12a which is to be illuminated during the scanning movement and also when the transfer of image data from each of the sub-scanners 1a to 1d to the controller 3 is impossible, and a multi-selection switch 12c serving to make a selection between effecting and not effecting the multi-reading which will be fully described later on.

Figure 1:
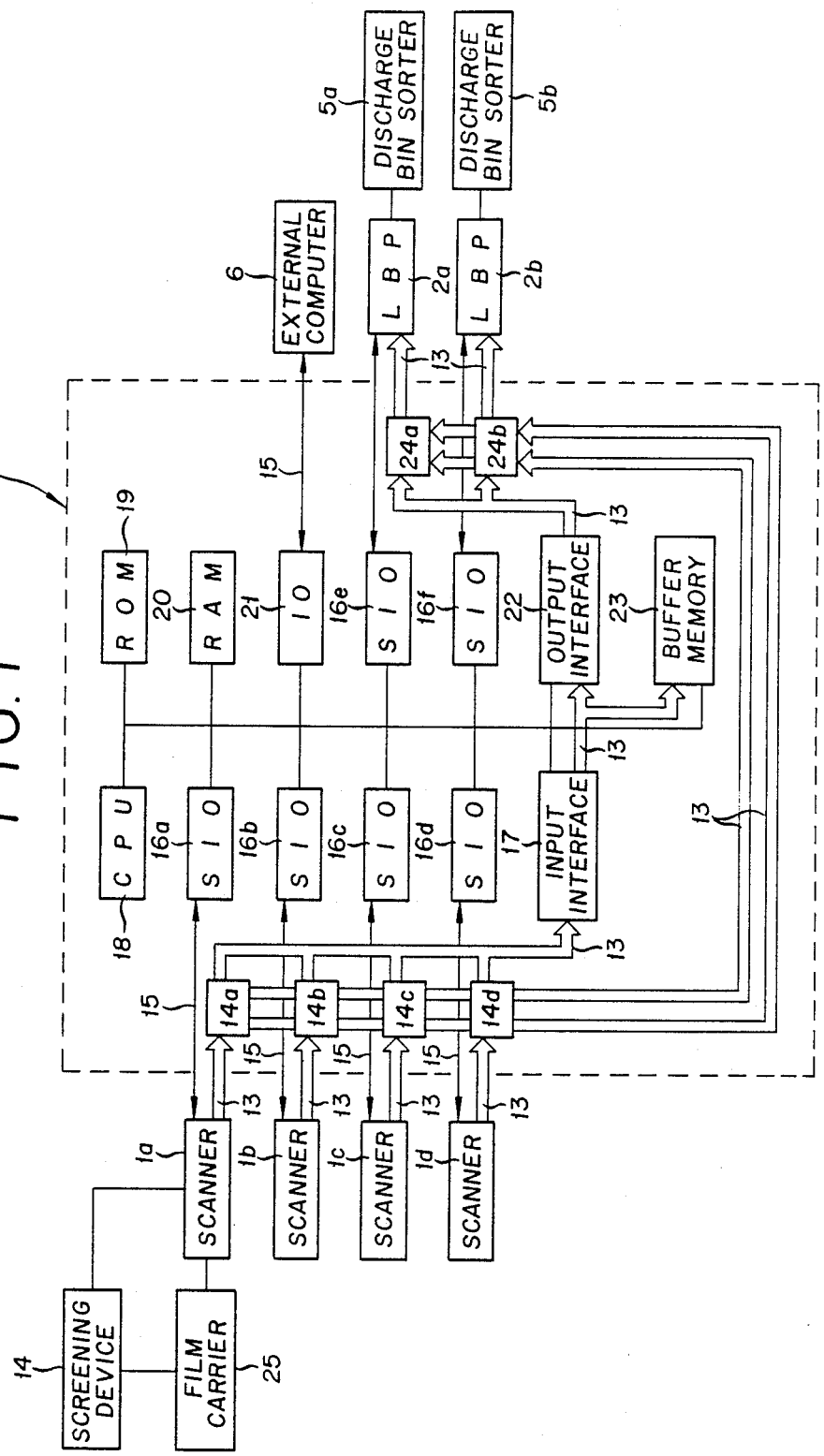
FIG. 1 is a schematic structural diagram illustrating the control part and its peripheral devices in a typical image processing system as one embodiment of this invention.

Now, the general construction of the control part and its peripheral devices in the image processing system of the present invention will be described below with reference to FIG. 1.

As illustrated in the diagram, to each of the scanners 1a to 1d each of which is provided with a control panel 7 mentioned above, is connected a film carrier 25 capable, of scanning various forms of microfilms and a screening device 14 for controlling the motion of the film carrier 25. To the scanners 1a to 1d, connected respectively thereto are input image bus switching parts 14a to 14d for switching image data via an image bus for transfer of image data. Also connected respectively thereto are serial input/output ports 16a to 16d via a control bus 15 for transferring control signals and others necessary for the exchange of image data. To these serial input/output ports 16a to 16d, connected severally thereto are an input interface 17 for feeding image data, a CPU 18 for issuing various commands based on the input data, an ROM 19 for storing various programs, a RAM 20 for temporarily sorting various data, an input/output port 21 having the external computer 6 connected thereto through the medium of the control bus 15, serial input/output ports 16e and 16f connected respectively to the LBP's 2a and 2b likewise through the medium of the control bus 15, an output interface 22 for feeding out image data, and a buffer memory 23 for temporarily storing one screen full of image data.

To the input image bus switching parts 14a to 14d, output image bus switching parts 24a and 24b are connected through the medium of two image buses 13, and at the same time, an input interface 17 is connected likewise through the medium of the image buses 13. Here, the two image buses 13 are necessary because two LBP's are connected to the controller 3. The number of image buses need not be limited to 2 but may be increased or decreased so as to equal the number of LBP's 2 to be used actually. To the input interface 17, the output interface 22 and the buffer memory 23 are mutually connected through the medium of the image buses 13. The output interface 17 is connected to the output image bus switching parts 24a and 24b through the medium of the image buses 13. Then, to the output image bus switching parts 24a and 24b, the LBP's 2a and 2b having the discharge bin sorters 5a and 5b connected respectively thereto are respectively connected.

Figure 4:
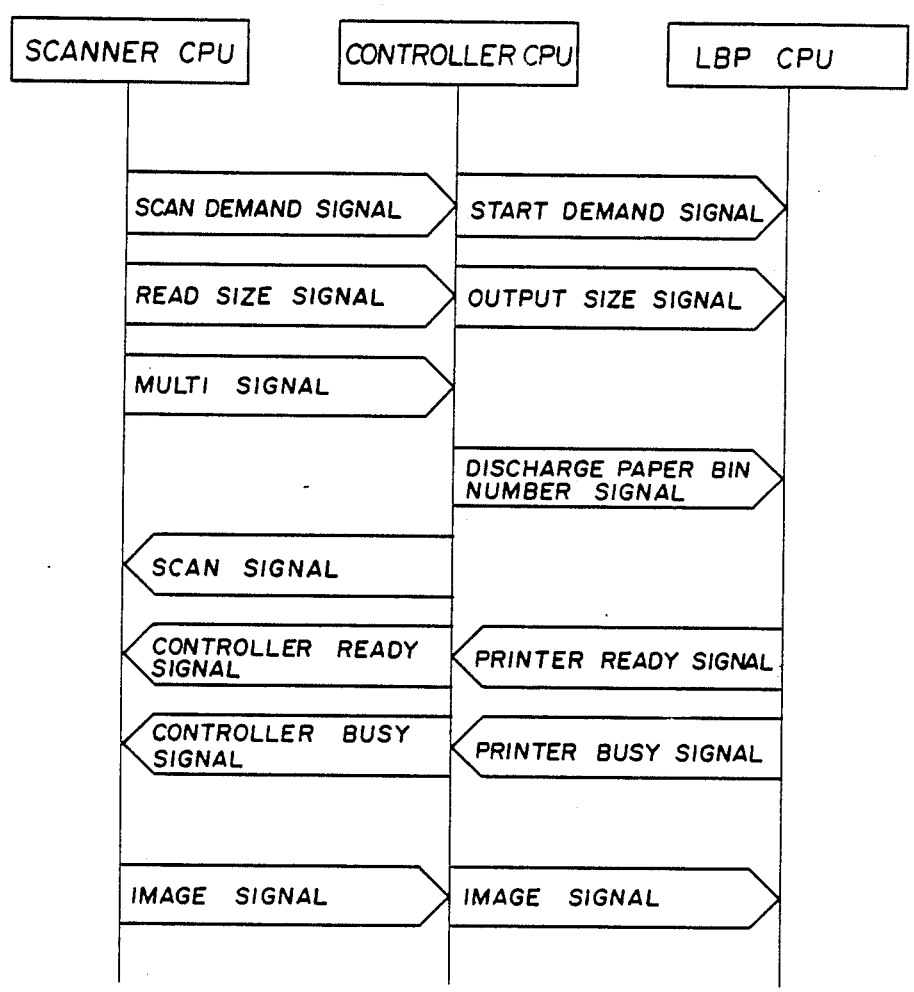
FIG. 4 is a diagram illustrating the traffic of signals within the system mentioned above.

Now, the operation of the image processing system constructed as described above will be explained below with reference to the diagram of FIG. 4 illustrating the traffic of signals within the image processing system and to the flowcharts of operation shown in FIGS. 5 to 10.

Figure 5:
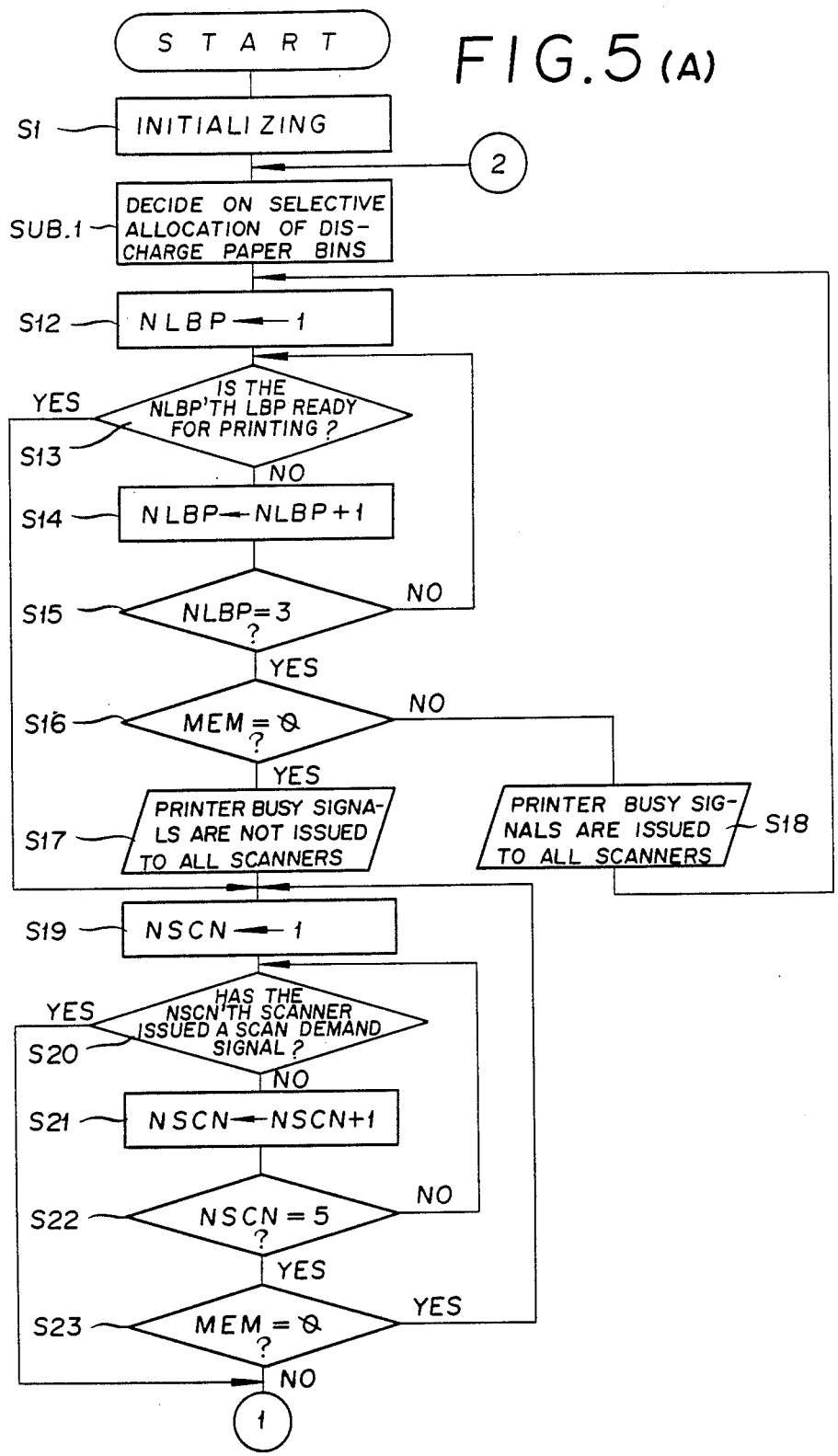
FIGS. 5 to 10 are flowcharts depicting the operations of the system mentioned above.
Figure 5B:
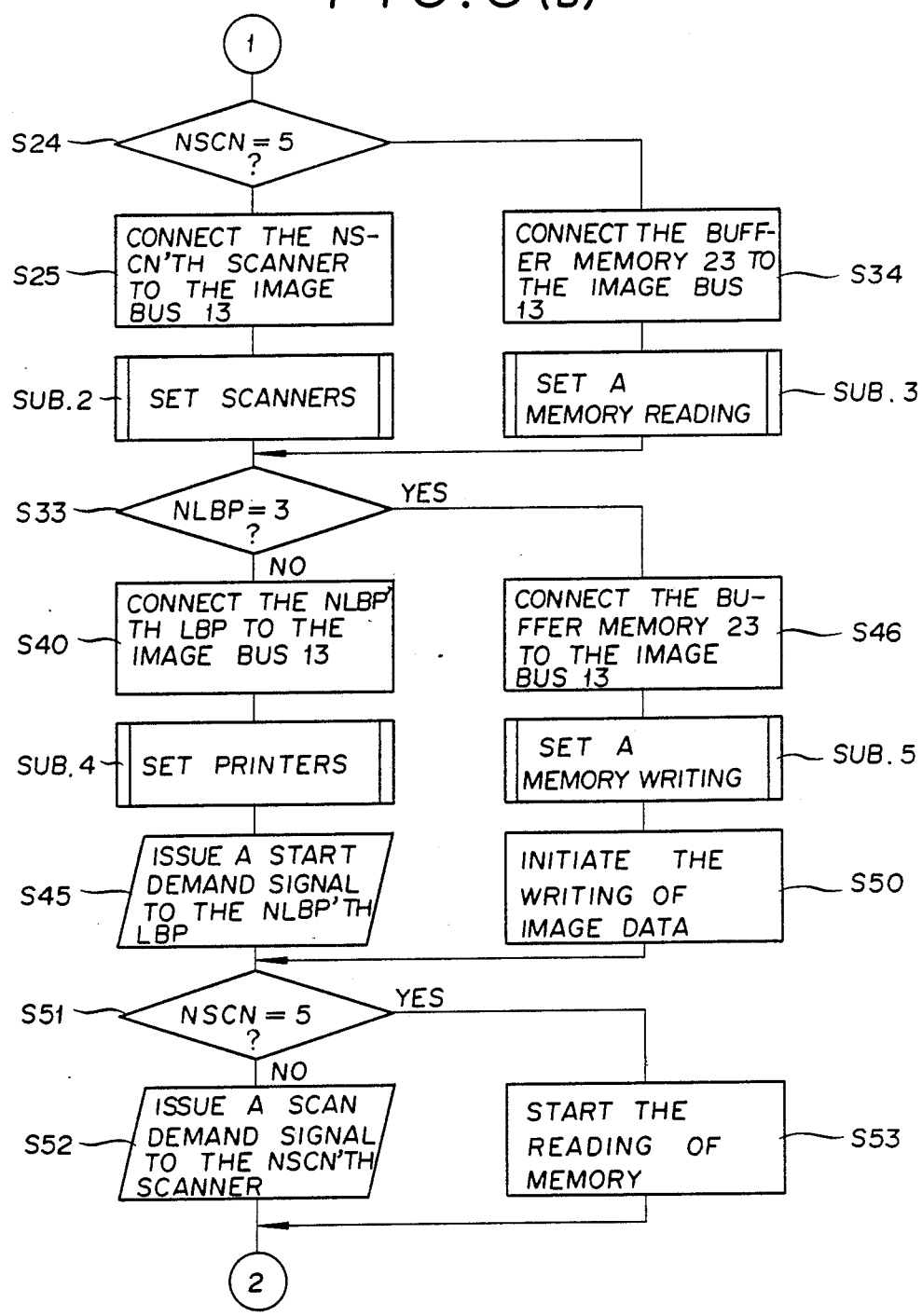
Figure 6A:
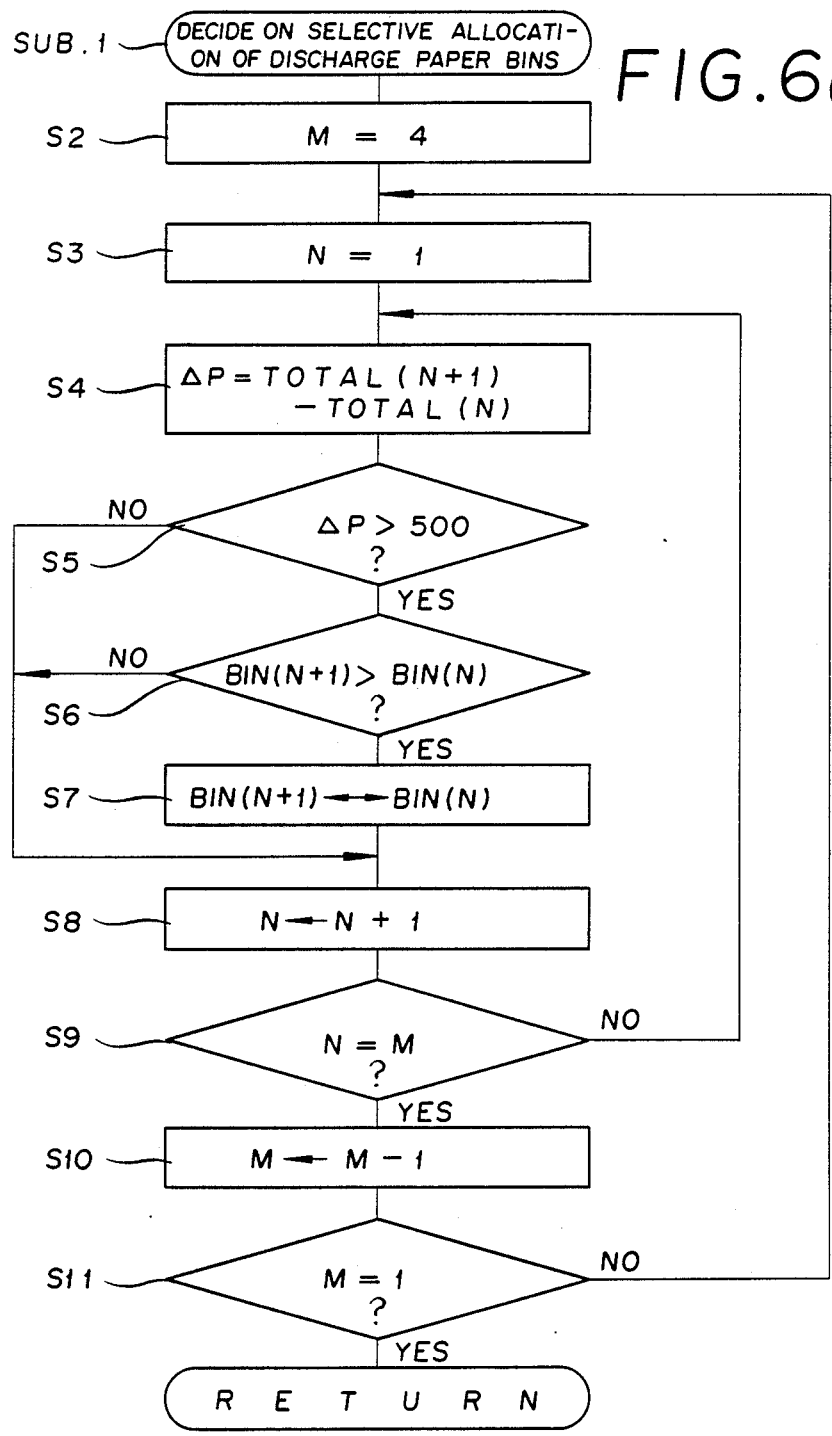
Figure 6B:
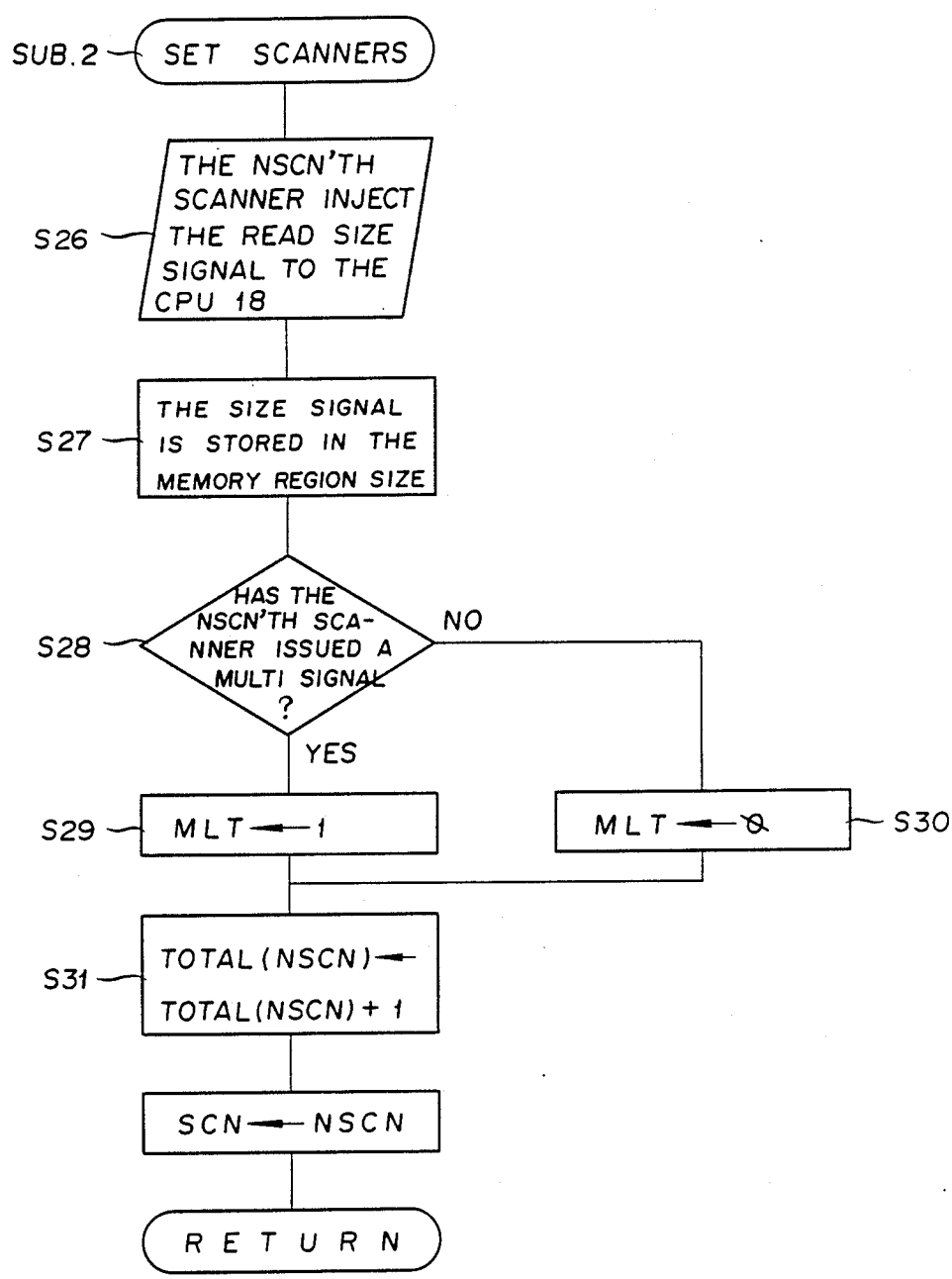
Figure 6C:
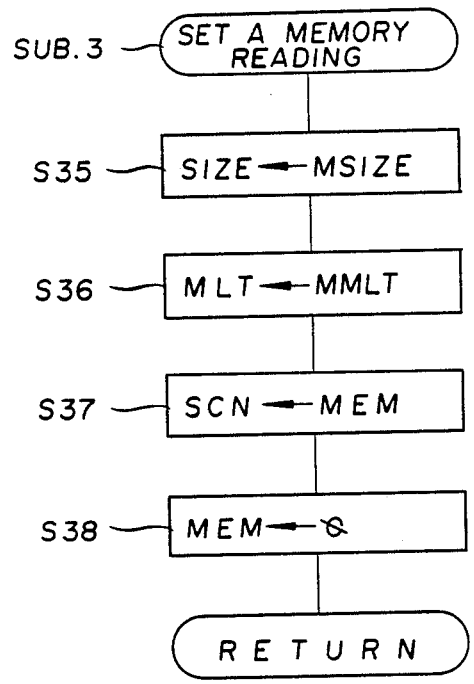
Figure 6D:
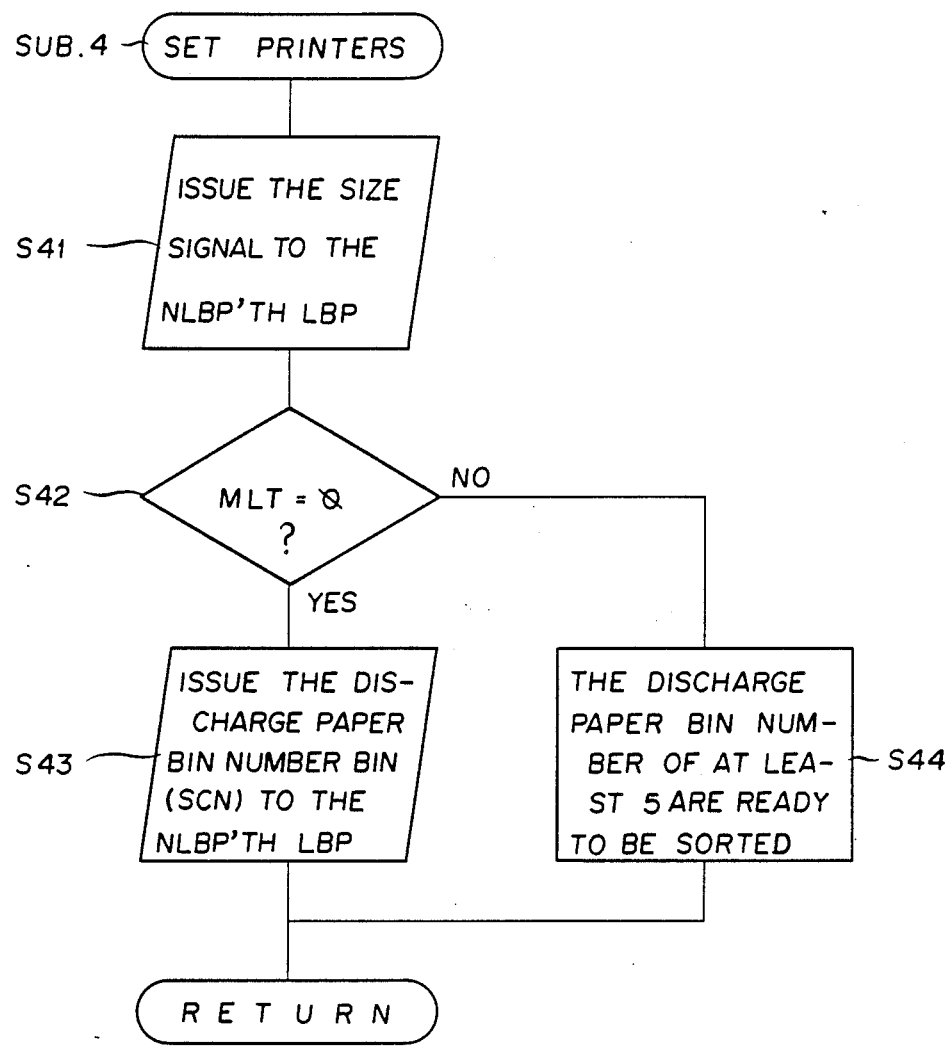
Figure 6E:
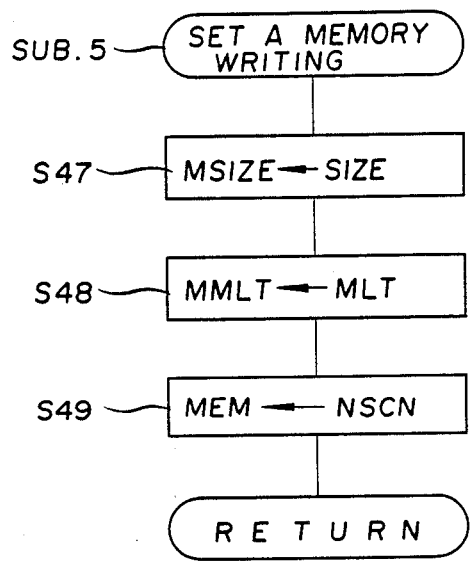

First, the description will be given with emphasis focussed on the flowchart of main routine in the controllers 3 shown in FIG. 5.

In the following description, the bins for each of the sorters 5a and 5b are assumed to be serially numbered as first bin, second bin, and so on in the descending order from the bin on the uppermost level. It is further assumed that the scanners 1a to 1d are serially numbered as first scanner, second scanner, and so on.

As the first step, initializing for starting the image processing system will be effected {Step 1 (hereinafter referred as "S1")}. When the preparation for starting the image processing system is completed in S1, a subroutine program for deciding on selective allocation of discharge paper bins 4 to the scanners 1a to 1d is executed {Subroutine 1 (hereinafter referred to as "SUB.1")}.

Now, the subroutine program for the selection of discharge paper bins will be described below with reference to the operational flowchart shown in FIG. 6 (A).

First, the numeral 4 is set in the counting value M in the first register disposed inside the CPU 18 and adapted to indicate the number of scanners 1, and at the same time, the numeral 1 is set in the counting value N in the second register (S 2 and S 3). The counting value M of the first register varies with the number of scanners to be installed. Then, the CPU 18 goes on to carry out the arithmetic operations by subtracting the number of scanning operation TOTAL (N) which the scanner has performed wherein the scanner being the Nth one shown by the second register from the number of scanning operations TOTAL (N+1) which the N+1st scanner has performed, and reports the results of this arithmetic operation as $\Delta\rho$ (S 4). As will be described in detail later on, the number of scanning operations made by a given scanner is memorized as the counting value and renewed every time one scanning is performed. The CPU 18, when necessary, is enabled therefore to read out the number of scanning operations so far made by anyone of scanners. The CPU 18 proceeds to decide whether the aforementioned result of the arithmetic operation $\Delta\rho$ is greater than 500 (S 5). When the decision in S 5 establishes that the $\Delta\rho$ is greater than 500, the processing advances to S 6. Conversely when the decision confirms that the $\Delta\rho$ is smaller than 500, the processing advances to S 6.

When it is established by the decision in S 5 that the $\Delta\rho$ is greater than 500, the CPU 18 proceeds to compare the discharge paper bin number BIN (N+1) assigned to the N+1th scanner and the discharge paper bin number BIN (N) assigned to the N'th scanner and finds which of them is greater (S 6). When it is confirmed by the decision in S 6 that BIN (N+1) is greater than BIN (N), the CPU 18 proceeds to interchange the discharge paper bin numbers, BIN (N+1) and BIN (N), (S 7). Conversely when the decision confirms that the relation is opposite, the CPU 18 advances the processing to S 8. IN S 4 to S 7, each of the discharge paper bins is respectively allocated to each of the scanners downwardly from the top bin based on the order wherein the total number of scanning operation so far performed decrease. When the total number of the scanner corresponding to the upper paper discharge bin and the total number of the scanner corresponding to the lower discharge paper bin are reversed with respect to quantity by performance of scanning, discharge bin numbers allocated to the scanners are interchanged if the difference of these total numbers is greater than the predetermined quantity, for example 500. Owing to this setup, allocated to the scanner more frequently used the upper discharge bin, so that the convenience to the removal of used paper is improved. Furthermore, the discharge paper bins allocated to the scanners do not frequency change places because the discharge bin numbers are not interchanged if the difference of the total numbers is less than 500. The confusion possibly caused on the part of the operator by frequent interchange of discharge paper bins can be precluded.

In consequence of the completion of S 7 or the decision in S 5 or S 6, the CPU 18 proceeds to rewrite the counting value N of the second register to read as N+1 (S 8). Then, the CPU 18 decides whether the counting value N of the second register equals the counting value M of the first register (S 9). When it is established by this decision that the two counting values are equal, the CPU deducts 1 from the counting value M of the first register. Conversely, when the decision denies the equality, the CPU 18 returns the processing to S 4.

When the processing in S 10 is completed, the CPU 18 decides whether or not the counting value M in the first register equals 1 (S 11). When the equality is established by this decision, the processing is returned to the main routine, i.e. S 12. Conversely, when the equality is denied by the decision, the processing is returned to S 3 and the processing in S 3 is repeated until the counting value M in the first register equals 1. In short, in S 8 to S 11, the processing in S 4 to S 7 is carried out on all the plurality of scanners.

In the processing of SUB. 1, the discharge paper bins are respectively allocated to the scanners from the top bin, which offers the greatest convenience to the removal of used recording papers, based upon the order wherein the numbers of scanning operations of the scanners decrease. Once discharge paper bin numbers are fixed for given scanners, interchange of discharge paper bins does not occur easily because the interchange needs the difference of the scanning operation numbers over 500. Thus, the confusion possibly caused on the part of the operator can be precluded and the efficiency of the operator's work is consequently improved. The present embodiment has been described as one continuing allocation of discharge paper bins at all times and performing the processing of SUB. 1 for the decision of discharge paper bins each time the scanners complete a reading action. This particular mode of performance is not critical. Alternately, the decision may be carried out at the time of initial setting immediately after the connection of the system to the power source and the allocation of discharge paper bins to the scanners for the day may be based, for example, on the total numbers of scanning operations registered on the previous day.

After the determination of the discharge paper bin numbers corresponding to the scanners 1a to 1d is completed in SUB. 1, the CPU 18 sets 1 as the counting value NLBP in the fourth register which serves to display the LBP number for the sake of control in S 12. At this point in the present embodiment, since two LBP's are connected to the scanners, the numbers 1 and 2 of the LBP numbers NLBP are used for designating the LBP's (2a and 2b) and the number-3 thereof for designating the buffer memory 23.

Then, the CPU 18 examines the LBP bearing the serial number of NLBP corresponding to the counting value displayed in the fourth register to decide whether or not the LBP has already issued a printer ready signal indicating that the LBP is ready for the printing (S 13). The processing advances to S 19 when the decision in S 13 has drawn an affirmative answer. The CPU 18 adds 1 to the counting value NLBP displayed in the fourth register when the decision has drawn a negative answer (s14). After the processing in s 14 is completed, the CPU 18 proceeds to decide whether or not the counting value NLBP has reached the counting number 3 designating the buffer memory 23 (S 15). When the decision in S 15 has established that the counting value NLBP is now equal to the counting value 3 designating the buffer memory 23, namely that some of the LBP's still await decision as to whether or not a printer ready signal has been issued, the processing is returned to S 13.

When the decision in S 15 establishes that the printer ready signals for all the LBP's have not been issued, the CPU 18 proceeds to examine the buffer memory 23 and decide whether or not the buffer memory has a space available for further writing (S 16). When the presence of a space for memory in the buffer memory 23 is confirmed, the printer busy signals are not issued to all the scanners 1a to 1d (S 17). When the absence of a space for memory in the buffer memory 23 is confirmed, the printer busy signals are issued to all the scanners 1a to 1d (S 18). Then, the processing is returned to S 12. The buffer memory 23 has a capacity for image data which is covered by one round of scanning.

The processing, thus, is allowed to advance to the next step, S 19, only when the decision made by CPU 18 in S 12 through S 18 establishes that the LBP's 2a and 2b have already issued printer ready signals or, in spite of the absence of such signal, the buffer memory 23 still has a space for storing image data.

Then, the CPU 18 sets 1 as the counting value NSCN in the first register which serves to display the scanner number for the sake of control (S 19). At this point, in the present embodiment, since four scanners are connected to the CPU 18, the numbers 1 to 4 in the scanner numbers NSCN are used for designating the scanners and the number 5 thereof for designating the buffer memory 23. The CPU 18 examines the scanner bearing the serial number of NSCN corresponding to the counting value to decide whether or not the scanner has issued a scan demand signal (S 20). The processing advances to S 24 when the decision in S 20 establishes that the scan demand signal has been issued. The CPU 18 adds 1 to the counting value NSCN when the decision establishes that the scan demand signal has not been issued (S 21).

When the processing in S 21 is completed, the CPU 18 examines the counting value NSCN and decides whether or not the counting value NSCN has reached the counting values 5 designating the buffer memory 23 (S 22). The processing advances to S 23 when the decision in S 22 establishes that the counting value NSCN is now equal to the counting value 5 designating the buffer memory, namely that the scan demand signals for all the scanners have not been issued. The processing returns to S 20 when the decision establishes that the counting value NSCN is not equal to the counting value 5 designating the buffer memory 23, namely that some of the scanner still await decision whether or not the scan demand signals have been issued.

When the decision in S 22 confirms that no scan demand signal has been issued for any of the scanners the CPU 18 examines the buffer memory 23 to decide whether or not it has a space for further writing, namely whether or not the buffer memory 23 has any image data stored therein (S 23). When the CPU 18, in the decision in S 23, confirms that no image data is stored in the buffer memory, the processing is returned to S 19. When this decision confirms the presence of image data in the buffer memory 23 or when the decision in CPU 18 establishes that the scan demand signals for the scanners have been issued, the CPU 18 proceeds to examine the first register a second time to decide whether or not the counting value NSCN in the first register has reached the counting value designating the buffer memory 23 (S 24). In short, the decision to be made in S 24 is intended to determine whether the demand for scanning is based on the scan demand signal or on the image data stored in the buffer memory 23.

When the CPU 18 in the decision in S 24 establishes that the counting value NSCN is not equal to the counting value designating the buffer memory 23, namely that the demand for scanning is made by the scan demand signal from the scanner, the CPU 18 switches the input image bus switching parts 14a to 14d so as to establish connection between the scanner bearing the serial number NSCN designating the scanner issuing the scan demand signal and the image bus 13 (S 25). After the processing in S 25 is completed, the CPU 18 proceeds to execute a subroutine program for setting scanners (SUB. 2).

Now, the operation of SUB. 2 for setting scanners will be described below with reference to FIG. 6 (B).

First, the read size signal indicating the size of recording papers which is set by the NSCN'th scanner currently issuing the scan demand signal is injected to the CPU 18 (S 26). This size signal is stored in a prescribed memory region SIZE of a RAM 20 (S 27). In the meantime, the CPU 18 examines the NSCN'th scanner and decides whether or not it has issued a multi signal (S 28). When the decision confirms that the scanner has issued the multi signal, the CPU 18 sets 1 as the counting value MLT in the fifth register which serves to indicate whether or not the scanner will effect multi-reading (S 29). When the decision denies the issuance of the multi signal, the CPU 18 proceeds to set 0 as the counting value MLT in the fifth register (S 30).

The term "multi-reading" as used herein refers to the reading operation which carries out a plurality of rounds of scanning continuously on one microfilm image to obtain as many pieces of output and the term "multi signal" to the type of signal which is issued to the CPU 18 of the controller 3 from the scanner CPU when the aforementioned multi-reading is carried out.

When the processing in S 29 and S 30 is completed, the CPU 18 proceeds to carry out the addition of 1 to the total number of rounds of scanning, TOTAL (NSCN), which the NSCN'th scanner has made so far and, at the same time, set NSCN as the scanner number SCN serving as the source for image reading at the time that the image data are produced by the LBP 2 (S 32). Then, the processing is returned to the main routine S 33. In S 31, the numbers of rounds of scanning made so far by the individual scanners which are read out in the decision of discharge paper bins are counted.

When the CPU 18, in the decision to be made S 24, establishes that the counting value NSCN is equal to the counting value designating the buffer memory, namely that the demand for scanning is made by the image data stored in the buffer memory 23, the CPU 18 proceeds to connect the buffer memory 23 to the image bus 13 through the medium of the input interface 17 (S 34). After the processing in S 34 is completed, the CPU 18 executes a subroutine program for setting a memory reading (SUB. 3).

Now, the operation of SUB. 3 for setting a memory reading will be described below with reference to FIG. 6 (C).

First, the CPU 18 sets a signal MSIZE indicating the size of image stored in the buffer memory 23 as a signal SIZE indicating the size of recording paper to be released from the LBP 2a or 2b (S 35) and, at the same time, sets a signal MMLT indicating whether or not the image stored in the buffer memory 23 has undergone multi-reading in the form of the counting value MLT which serves to indicate whether or not the scanner effects multi-reading (S 36). Then, the CPU 18 proceeds to set the number MEM of the scanner which has read the image data stored in the buffer memory 23, as the scanner number SCN serving as the source for image reading at the time that the image data are fed out to the LBP 2a or 2b (S 37). When this processing is completed, the CPU 18 proceeds to set 0 as the scanner number MEM as the source for reading the image stored in the buffer memory 23 (S 38). The processing is then returned to the main routine S 33.

After the operation of SUB. 2 or SUB. 3 is completed, the CPU 18 proceeds to examine the fourth register and decide whether or not the counting value NLBP is equal to 3, namely whether or not the LBP has issued a printer ready signal (S 33). When the decision made in S 33 confirms that the LBP has issued the printer ready signal, the CPU 18 switches the output image switching parts 24a and 24b so as to establish connection between the NLBP'th LBP and the image bus 13 (S 40). After the processing in S 40 is completed, the CPU 18 carries out a subroutine program for setting a printer (SUB. 4).

Now, the operation of SUB. 4 for setting a printer will be described below with reference to FIG. 6 (D).

First, the CPU 18 issues to the NLBP'th LBP, namely the LBP which is ready for printing, the size signal indicating the size of the image (S 41). then the CPU 18 proceeds to examine the fifth register to decide whether or not the counting value MLT thereof is 0, namely whether or not the scanner will carry out multi-reading, (S 42). When this decision confirms that the scanner will not carry out multi-reading, the CPU 18 issues to the NLBP'th LBP the discharge paper bin number BIN(SCN) allocated by the aforementioned operation of SUB. 1 to the scanner number SCN which serves as the source for image reading at the time that the image data are produced by the LBP (S 43). In contrast, when the decision confirms that the scanner will carry out multi-reading, the CPU 18 issues to the NLBP'th LBP the discharge paper bin number of at least 5 indicating that the recording papers already used for printing are ready to be sorted (S 44). After the processing in S 43 or S 44 is completed, the processing is returned to the main routine S 45. When the printer is selected and readied, the CPU 18 issues a start demand signal to the NLBP'th LBP (S 45).

Conversely when the decision to be made in S 33 confirms that the LBP has not issued any printer ready signal, the CPU 18 proceeds to switch the output image switching parts 24a and 24b and, at the same time, establish connection between the buffer memory 23 and the image bus 13 through the medium of the output interface 22 (S 46). After the processing in S 46 is completed, the CPU 18 carries out a subroutine program for setting memory writing (SUB. 5).

Now, the operation of SUB. 5 for setting memory writing will be described below with reference to FIG. 6 (E).

First, the CPU 18 sets a signal SIZE indicating the size of recording paper to be released by the LBP 2, as the signal MSIZE which serves to indicate the size of image to be stored in the buffer memory 23 (S 47) and, at the same time, sets a counting value MLT of the fifth register serving to indicate whether or not the scanner effects multi-reading, as the signal MMLT indicating whether or not the image stored in the buffer memory 23 is in a multi form (S 48). then, the CPU 18 proceeds to set the scanner number NSCN for the sake of control which is the counting value in the first register, as the scanner number MEM which is the source for the reading of the image stored in the buffer memory 23 (S 49). After the operation just described is completed, the processing is returned to the main routine S 50. Then, the CPU 18 proceeds to initiate the writing of image data in the buffer memory 23 (S 50).

After the processing in S 45 or S 50 is completed, the CPU 18 makes a decision whether the demand for scanning is made by the scan demand signal or by the image data from the buffer memory 23 (S 51). When the decision confirms that the demand for scanning is based on the scan demand signal, the CPU 18 issues a scan signal to the NSCN'th scanner which has issued the demand for scanning (S 52). Conversely when the decision confirms that the demand for scanning is based on the image data from the buffer memory 23, the CPU 18 proceeds to start the reading of memory (S 53). When the processing in S 52 or S 53 is completed, the processing returns to SUB. 1 and effects the control all over again.

Figure 7A:
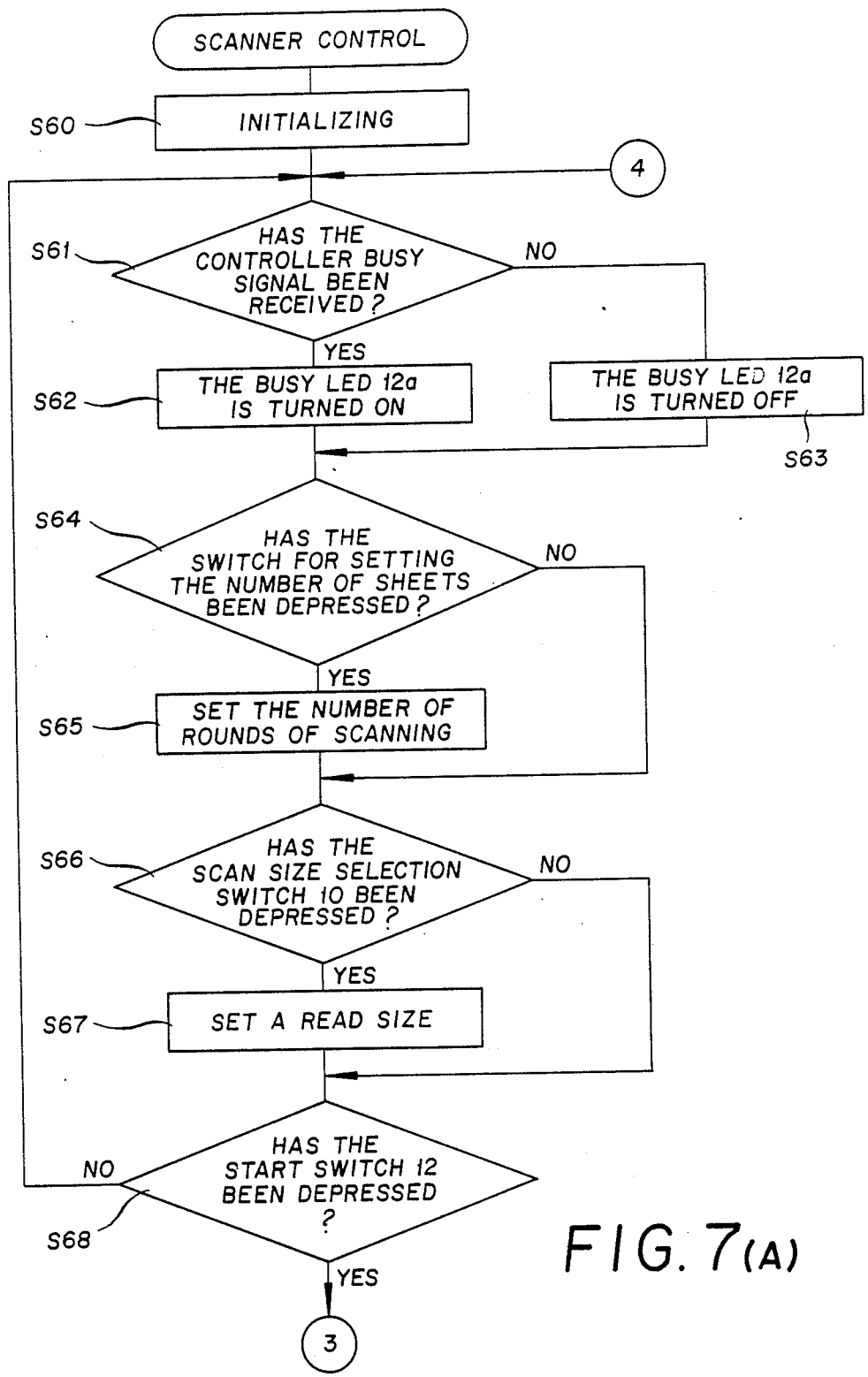
Figure 7B:
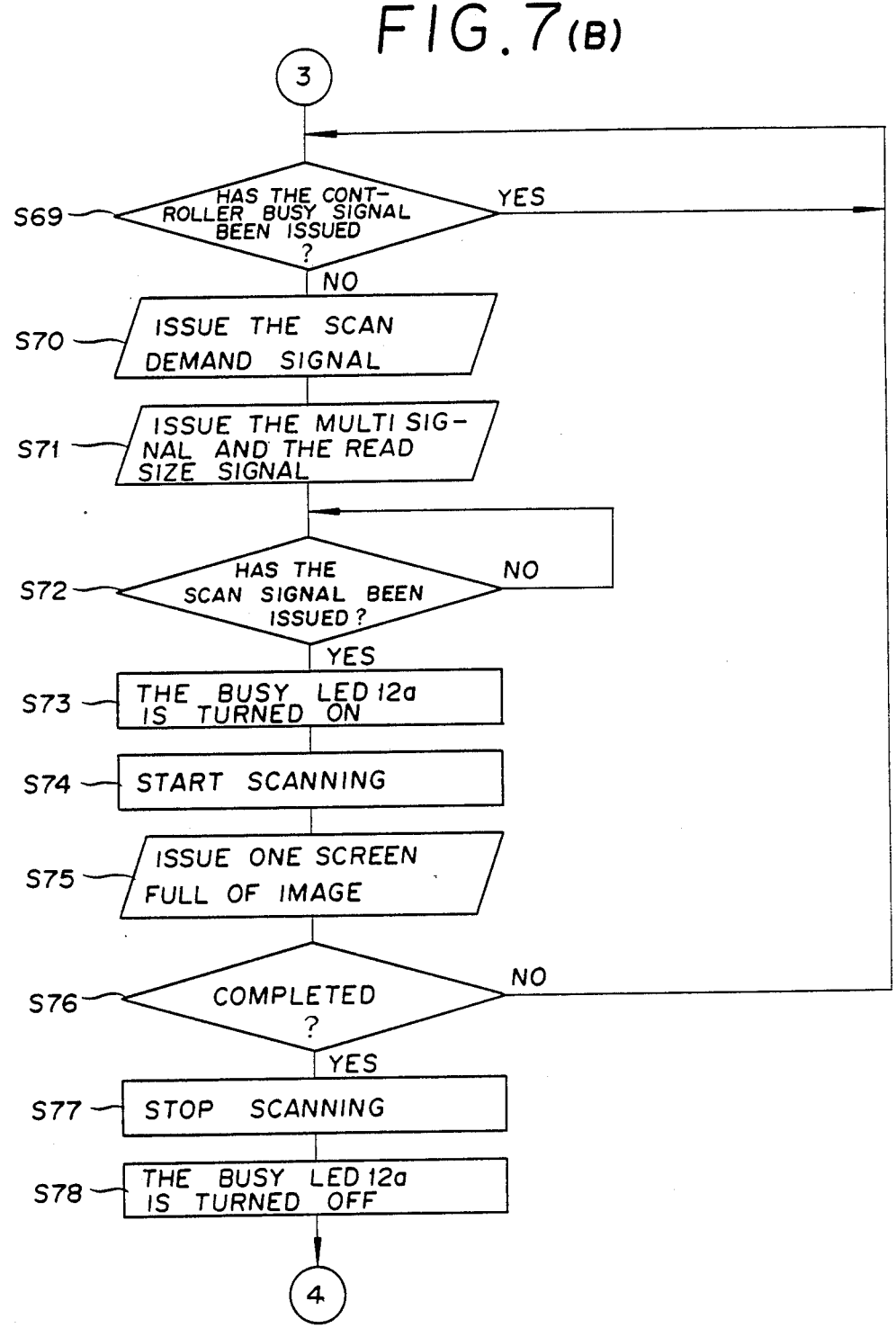

Now, the flow of control of the scanners will be described below with reference to the operational flowchart shown in FIG. 7. Hereinafter, the microcomputer which controls the scanners will be referred to as "scanner CPU".

First, initializing of the scanner 1 is made (S 60) to have the scanner 1 readied for operation (S 60). When the preparation for starting the scanner 1 in S 60 is completed, the scanner CPU decides whether or not a controller busy signal indicating that transfer of image date from the scanner to the controller 3 is prohibited has been received by the scanner (S 61). When the decision confirms that the controller busy signal has been received by the scanner, the busy LED 12a shown in FIG. 3. is turned on (S 62). Conversely when the decision establishes that the controller busy signal has not been received, the scanner CPU proceeds to turn off the busy LED 12a (S 63). In short, when the transfer of image data from the scanner to the controller 3 is prohibited, the busy LED 12a is set glowing by way of informing the operator of this fact. By this measure, the operator is enabled, when he cannot start the scanner by depressing the start switch 12, to find easily whether the failure of the scanner to respond to the depression of the start switch is due to mechanical trouble of the scanner or to the controller busy state. The term "controller busy state" as used herein refers to the state that the buffer memory 23 is devoid of a space available for further writing. The expression that "the LBP's 2a and 2b are busy" as used herein refers to the state in which the LBP's 2a and 2b have issued printer busy signals. To be specific, this state is assumed when the LBP's are in the process of producing an images or in the process of being repaired for removal of stuck paper.

After the processing in S 62 or S 63 is completed, the scanner CPU proceeds to decide whether or not a switch for setting the number of sheets has been depressed (S 64) and, on finding the switch in a depressed state, sets the number of rounds of scanning (S 65) or, otherwise, advances the processing to S 66. Further, the scanner CPU makes a decision whether or not the scan size selection switch 10 has been depressed (S 66) and, on finding this switch 10 in a depressed state, sets a read size (S 67) or, otherwise, advances the processing to S 68. Then, the scanner CPU decides whether or not the start switch 12 has been depressed (S 68) and, on finding the start switch 12 in a depressed state, and advances the processing to S 69 or, otherwise, advances the processing to S 61.

Then, the scanner CPU proceeds to decide whether or not the controller busy signal has been issued (S 69). When it is established by this decision that the controller busy signal has not been received, the scanner CPU feeds out a scan demand signal (S 70) and turns off the busy LED 12a and, at the same time, feeds out a multi-signal and a read size signal (S 71). Conversely, when it is confirmed by the decision that the controller busy signal has been received, the scanner CPU repeats the decision of S 69 until the aforementioned signals are turned off. The scanner CPU also decides whether or not the CPU 18 of the controller has issued a scan signal (s 72). When it is confirmed by the decision that the scan signal has been received, the scanner CPU turns on the busy LED 12a (S 73) and, at the same time, starts scanning (S 74) and feeds one screen full (one page full) of image signal to the controller 3 (S 75). Conversely, when it is conformed by the decision that the scan signal has not been received, the scanner CPU repeats the decision of S 72 until the signal is received.

Then, the scanner CPU decides whether or not the final scanning of the multi-reading has been completed. When the decision confirms that the scanning has not been completed, the processing is returned to S 69. Conversely, when the decision establishes that the final scanning has been completed, the scanner CPU stops the scanning motion (S 77) and, at the same time, turns off the busy LED 12a (S 78). When the processing of S 78 is completed, the processing is returned to S 61 and the preceding processing is repeated.

Figure 8:
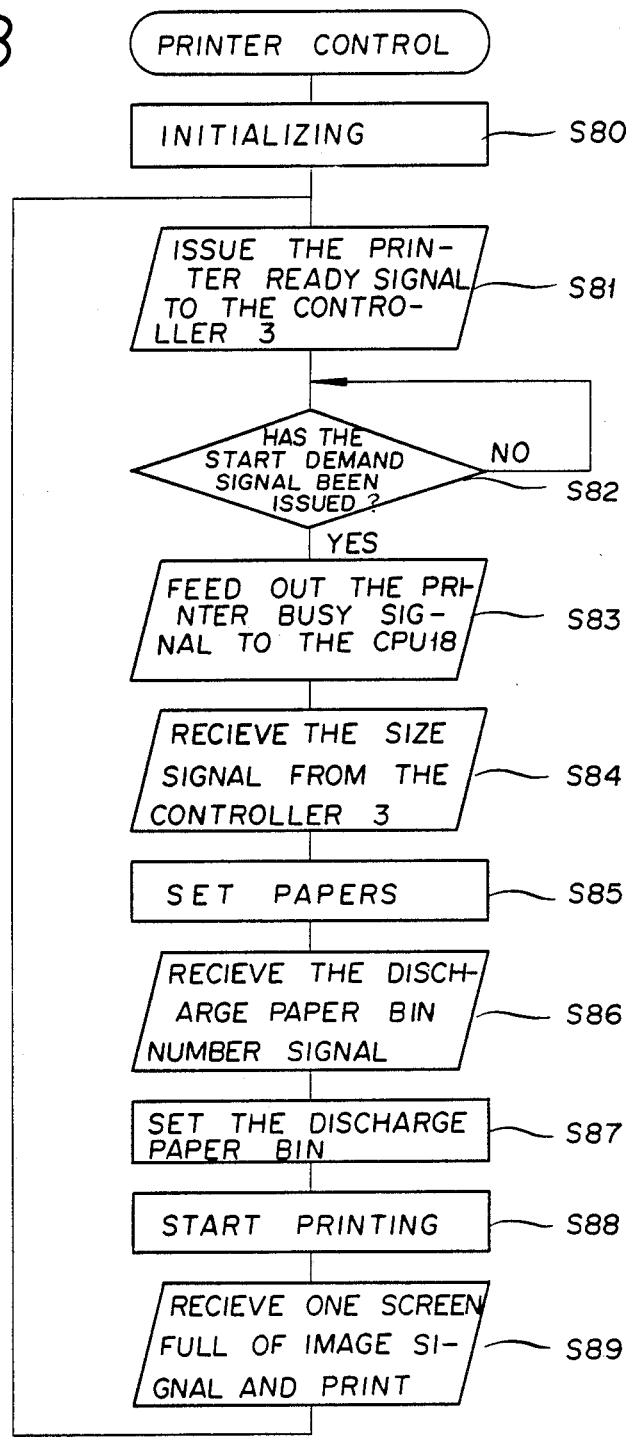

Now, the procedure of control of the microcomputer which controls the LBP's 2a and 2b will be described below with reference to the flowchart of operation shown in FIG. 8. This microcomputer will be referred to as LBP CPU hereinafter.

First, initial setting of LBP is effected so as to prepare the LBP for operation (S 80). When the preparation for starting the LBP's is completed in S 80, the LBP CPU issues the printer ready signal to the controller 3 by way of informing the operator that the print is ready to be started. Then, the LBP CPU decides whether or not the start demand signal has been issued (S 82) and, on confirming that the start demand signal has been issued, feeds out the printer busy signal to the CPU 18 (S 83) or, otherwise, causes the processing of S 82 to be repeated until the printer busy signal is received.

When the processing in S 83 is completed, the LBP CPU receives from the controller 3 the size signal designating the size of recording paper (S 84) and, based on this size signal, causes the LBP to carry out the action of setting papers ready for use (S 85). The LBP CPU also receives from the controller 3 the discharge paper bin number signal designating the discharge paper bin number (S 86) and, based on the discharge paper bin number signal, carries out the action of setting the discharge paper bin (S 87). When the processing of S 87 is completed, the LBP CPU starts the printing action (S 88) and, on receiving one screen full of image signal from the controller 3, carries out the printing action in response to the image signal thus received (S 89).

In the present embodiment, the indicator 8 placed on the control panel 7 which is installed on each of the scanners 1a to 1d is adapted to indicate the particular discharge paper bin selected for discharging recording papers on which images have been printed based on the image date fed out by the corresponding scanner. Since the indicators 8 enable the operator to find the pertinent discharge paper bin at a glance, they serve the purpose of precluding the possibility of the operator taking recording papers from a wrong discharge paper bin.

Further in the present embodiment, the external computer 6 which is connected to the system through the medium of the control bus 15 and the input/output port 21 carries out the following operations. It parallelly controls the screening devices 14 connected severally to the scanners 1a to 1d as a host computer, synthesizes image signals introduced through a given scanner 1 on the buffer memory 23, synthesizes image signals introduced through a given scanner 1 in combination with data introduced through the external computer 6 on the buffer memory 23, produces a plurality of hard copies with one scanning motion by storing image data in the buffer memory 23, effects partial erasure of image data by masking or trimming on the buffer memory 23, enlarges, reduces, or rotates an image on the buffer memory 23, moves an image on the buffer memory 23, and so on.

The processing in SUB. 1 shown in FIG. 6 (A) causes the discharge paper bins to be respectively allocated to the scanners from the top bin based on frequency of use of the scanners. Alternately, the discharge paper bins may be allocated one each to the scanners based on the order wherein the power sources of the scanners are turned on according to the procedure of the flowchart shown in FIG. 9 instead of the procedure of the flowchart shown in FIG. 6 (A).

Figure 9:
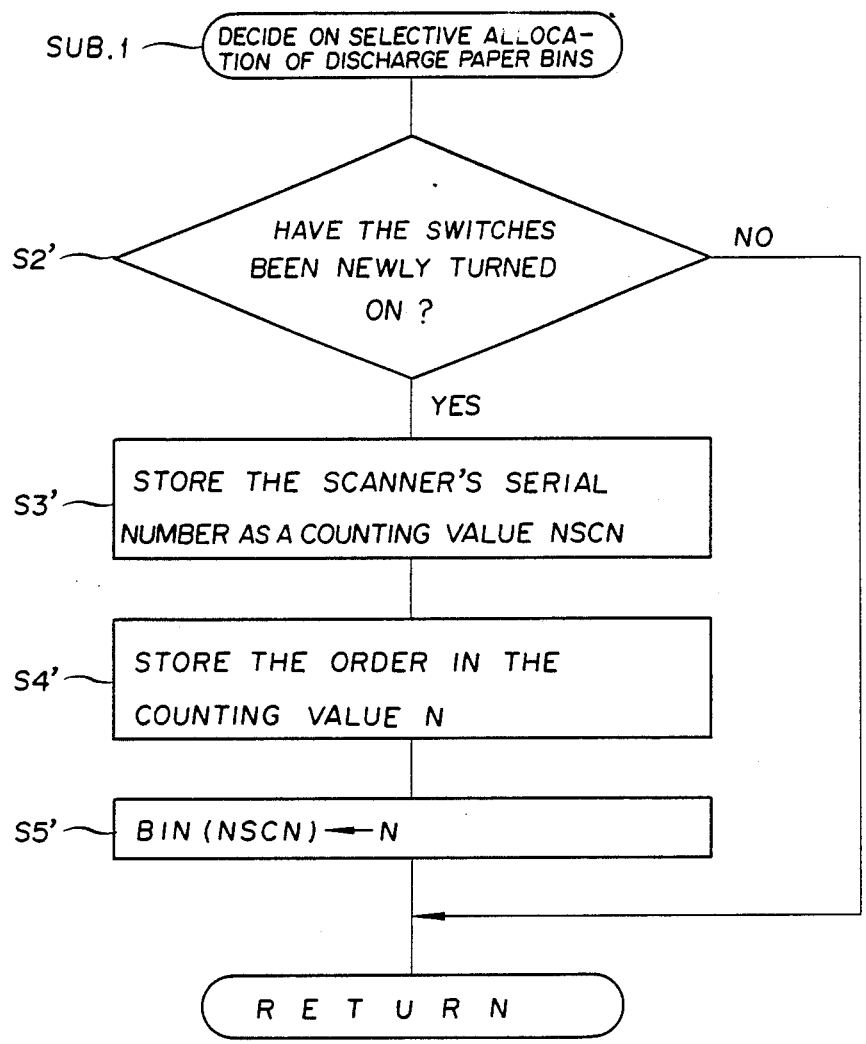

Now, the flowchart of FIG. 9 will be described below. The CPU 18 first examines the power source switches (not shown) for the scanners 1a to 1d to determine whether or not any of the switches has been newly turned on (S2'). When the absence of a newly turned switch is confirmed, the process is returned to S12 of the main flowchart. When the presence of a newly turned switch is confirmed, the serial number assigned to the scanner for which the corresponding power source switch has been newly turned on is stored in the form of a counting value NSCN in the first register serving to display the scanner number used for the sake of control (S3'). At the same time that S3' is executed, the CPU 18 causes the order, in which the aforementioned power source switches have been turned on, to be stored in the counting value N of the second register serving to display the order in which the power source switches have been turned on (S4').

On completion of S3' and S4', the CPU 18 proceeds to carry out a control for setting one to one the counting value N of the second register as the counting value BIN(NSCN) which serves to display the discharge paper bin assigned to the particular one of the scanners 1a to 1d. Said particular one bears NSCN as the scanner number (S5'). In S2' to S5', the discharge paper bin numbers to be corresponding to the scanners are determined one to one without skipping between the discharge paper bins based on the order in which the power source switches of the scanners are turned on. Namely, in the present embodiment has been described, the discharge paper bin numbers corresponding to the scanners based on the order in which the power source switches of the scanners are turned on. Alternately the discharge paper bins may be allocated to the scanners based on the order in which the scanners are actuated.

Figure 10:
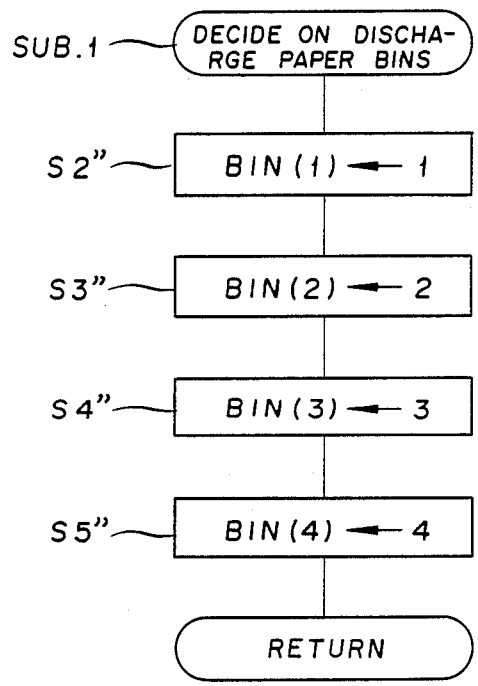

Otherwise, the discharge paper bins may be allocated one to one in a fixed sequence to the scanners as shown by the flow always chart of FIG. 10.

Now, the flow chart of FIG. 10 will be described below. First, the counting value BIN (n) is set in the register which serves to indicate the discharge paper bin number allocated to a given n'th scanner in all the scanners 1a to 1d. This setting is made so as to allocate the first discharge paper bin to the counting value BIN (1) in the register (S 2"), the second discharge paper bin to the counting value BIN (2) (S 3"), the third discharge paper bin to the counting value BIN (3), (S 4"), and fourth the discharge paper bin to the counting value BIN (4) (S 5") respectively. By the processing described above, the discharge paper bins are allocated one to one in a fixed sequence to the scanners.

In the embodiment described above, when the scanners are caused to carry out multi-reading, the sorting operation can alternatively be effected in a mode wherein with the discharge paper bins other than those allocated to the scanners, specifically with the fifth and subsequent discharge paper bins, are used. This sorting operation can be actually performed by various methods. The first method comprises allocating discharge paper bins one to one to successive images and stowing recording papers one each to the bins per image. The second method which is used in reading out one by one the individual images contained in one set of a plurality of pages comprises stowing used recording papers sequentially in the discharge paper bins in such a manner that a plurality of sets each of the aforementioned plurality of serially numbered pages are distributed one each to the discharge paper bins. In the second method, the mode of designating the discharge paper bins is varied with the order in which the scanners are called to read images. In one mode, the multi-reading may be attained by scanning the individual pages one by one sequentially and repeating this cycle as many times as the sets desired to be obtained. In another mode, the multi-reading may be accomplished by repeating the scanning of the image in the first page as many times as the sets desired and repeating this cycle on each of the subsequent pages. In either case, the sorting of used recording papers can be obtained as desired by designating the order of the discharge paper bins.

The embodiment has been described as one using a microfilm reader as an image reader. The use of the microfilm reader is not critical. Optionally, the image processing system may be configured by employing as an image reader a device capable of converting a visible image into electric signals.

Finally, though the present embodiment has been described as one using a laser beam printer as a printing means, the use of the laser beam printer is not critical. Optionally, the image processing system may be configured by adopting as a printing means such a device as an ink jet printer or a thermal printer which is capable of converting an image signal into a visible image on a recording paper.

What is claimed is:

1. An image processing system comprising:
a plurality of image readers each of which optically reads images and produces a corresponding image signal for each image;
printing means for forming images on sheets in accordance with said image signals;
sorting means connected to said printing means, provided with a plurality of discharge paper bins, and adapted to sort sheets on which the images have been printed by said printing means;
switching means for connecting an arbitrarily selected one of said image readers to said printing means and consequently effecting transfer of said image signal produced from said selected image reader to said printing means;
allocation means for allocating said discharge paper bins of said sorting means to respective image readers so that each of said image readers has a discharge paper bin allocated to it; and
control means for controlling said sorting means in such a manner during the formation of an image by said printing means based on said image signal that sheets on which said images have been printed are stowed into the discharge paper bin allocated to the image reader which has produced said image signal.

2. An image processing system comprising:
a plurality of image readers each of which optically reads images and produces a corresponding image signal for each image;
printing means for forming images on sheets in accordance with said image signals;
sorting means connected to said printing means, provided with a plurality of discharge paper bins, and adapted to sort sheets on which an image has been printed by said printing means;
switching means for connecting an arbitrarily selected one of said image readers to said printing means and consequently effecting transfer of said image signal produced from said selected image reader to said printing means;
allocation means for allocating said discharge paper bins of said sorting means respectively to said image readers; and
control means for controlling said sorting means in such a manner during the formation of an image by said printing means based on said image signal that sheets on which said images have been printed are stowed into the discharge paper bin allocated to the image reader which has produced said image signal;
wherein said allocation means allocates said bins in accordance with the frequency of use of said image readers.

3. An image processing system according to claim 2, wherein said allocation means allocates said bins vertically arranged downwardly to said image readers whose frequency of use decreases sequentially.

4. An image processing system comprising:
a plurality of image readers each of which optically reads images and produces a corresponding image signal for each image;
printing means for forming images on sheets in accordance with said image signals;
sorting means connected to said printing means, provided with a plurality of discharge paper bins, and adapted to sort sheets on which an image has been printed by said printing means;
switching means for connecting an arbitrarily selected one of said image readers to said printing means and consequently effecting transfer of said image signal produced from said selected image reader to said printing means;
allocation means for allocating said discharge paper bins of said sorting means respectively to said image readers; and
control means for controlling said sorting means in such a manner during the formation of an image by said printing means based on said image signal that sheets on which said images have been printed are stowed into the discharge paper bin allocated to the image reader which has produced said image signal;
wherein said allocation means allocates said bins to said image readers based on the order in which power sources of the image readers are turned on.

5. An image processing system according to claim 4, wherein said allocation means allocates said bins vertically arranged downwardly to said image readers whose connection to power source occurs chronologically.

6. An image processing system comprising:
a plurality of image readers each of which optically reads images and produces a corresponding image signal for each image;
printing means for forming images on sheets in accordance with said image signals;
sorting means connected to said printing means, provided with a plurality of discharge paper bins, and adapted to sort sheets on which an image has been printed by said printing means;
switching means for connecting an arbitrarily selected one of said image readers to said printing means and consequently effecting transfer of said image signal produced from said selected image reader to said printing means;
allocation means for allocating said discharge paper bins of said sorting means respectively to said image readers; and
control means for controlling said sorting means in such a manner during the formation of an image by said printing means based on said image signal that sheets on which said images have been printed are stowed into the discharge paper bin allocated to the image reader which has produced said image signal;
wherein said image readers are provided with display means for displaying bins allocated by said allocation means.

7. An image processing system comprising:
- a plurality of image readers each of which converts images into electric signals and produces the resultant electric signals;
- printing means for forming images on sheets in accordance with said image signals, said printing means provided with sorting means incorporating therein a plurality of discharge paper bins, said sorting means serving to sort sheets on which said image has been printed;
- means for connecting a particular one of said image readers selected to initiate a reading operation to said printing means and consequently effecting transfer of said image signal produced from said image reader to said printing means;
- allocation means for allocating said discharge paper bins of said sorting means to respective image readers so that each of said image readers has a discharge paper bin allocated to it;
- signal generating means for generating a bin signal designating the discharge paper bin allocated to the image reader selected to initiate said reading operation; and
- control means for controlling said printing means so as to stow sheets in said discharge paper bin designated by a bin signal generated by said signal generating means.

8. An image processing system according to claim 7, further comprising means for sequentially distributing sheets to the discharge paper bins other than said discharge paper bins allocated by said allocation means.

9. an image processing system comprising:
- a plurality of image readers each of which converts images into electric signals and produces the resultant electric signals;
- printing means for forming images on sheets in accordance with said image signals, said printing means provided with sorting means incorporating therein a plurality of the discharge paper bins, said sorting means serving to sort sheets on which said image has been printed;
- means for connecting a particular one of said image readers selected to initiate a reading operation to said printing means and consequently effecting transfer of said image signal produced from said image reader to said printing means;
- allocation means for allocating said discharge paper bins of said sorting means to said image readers;
- signal generating means for generating a bin signal designating the discharge paper bin allocated to the image reader selected to initiate said reading operation; and
- control means for controlling said printing means so as to stow sheets in said discharge paper bins designated by a bin signal generated by said signal generating means;
- wherein said allocation means are provided with memory means for memorizing the number of rounds of operation made by said image readers and adapted to allocate said discharge paper bins in accordance with said number of rounds of operation memorized by said memory means.

10. An image processing system according to claim 9, wherein said allocation means compare the numbers of rounds of reading made by said image readers and stored in said memory means, allocate discharge paper bins to said image readers in accordance with the decreasing order of said numbers of rounds and, when the decreasing order of said numbers of rounds is reversed by a difference of a fixed value, interchange the discharge paper bins allocated to the image readers involved in said reversal of the decreasing order.

11. An image processing system comprising:
- a plurality of image readers each of which converts images into electric signals and issues image signals as outputs;
- printing means for forming images on sheets in accordance with said image signals, said printing means provided with a plurality of discharge paper bins and sorting means for sorting and stowing sheets carrying a printed image into said discharge paper bins;
- transfer means for connecting a particular one of said image readers selected for starting a reading action to said printing means and consequently effecting transfer of said image signal produced by said particular image reader to said printing means;
- allocation means for allocating said discharge paper bins of said sorting means to each of said image readers so that each of said image readers has a discharge paper bin allocated to it;
- mode selecting means for selecting a first sorting mode and a second sorting mode; and
- control means for controlling the sorting means so as to discharge, when the first sorting mode is selected by said mode selecting means, the sheet on which the image has been printed into the discharge paper bin allocated to the image reader which has produced said image signal of the image on the sheet to be discharged and so as to effect, when the second sorting mode is selected by said mode selecting means, a sorting operation with the discharge paper bins other than that allocated to the image readers.

12. An image processing system comprising:
- first and second image generating means for respectively generating first and second image signals;
- a printing device for forming images on sheets in accordance with said first and second image signals from said first and second image generating means;
- a sorting device connected to said printing device, including first and second discharge bins which respectively stack the sheets having the images thereon, said first and second discharge bins respectively corresponding to said first and second image generating means; and
- control means for controlling said sorting device so as to discharge the sheet on which the image has been printed in accordance with the first image signal into said first discharge bin and to discharge the sheet on which the image has been printed in accordance with the second image signal into said second discharge bin.

13. An image processing system according to claim 12, wherein said first and second image generating means are respectively image readers for optically reading images and producing signals.

14. An image processing system comprising:
- a plurality of image readers each of which optically reads images and produces image signals;
- a number of printing means which is less than the number of said image readers for forming images on sheets in accordance with said image signals;
- sorting means connected to said printing means, provided with a plurality of discharge paper bins, and adapted to sort sheets on which an image has been printed by said printing means;

switching means for connecting an arbitrarily selected one of said image readers to said printing means and consequently effecting transfer of said image signal produced from said selected image reader to said printing means;

allocation means for allocating said discharge paper bins of said sorting means respectively to said image readers so that each of said image readers has a discharge paper bin allocated to it; and control means for controlling said sorting means so as to discharge the sheets on which said images have been printed are stowed into the discharge paper bin allocated to the image reader which has produced said image signal of the image on the sheet to be discharged.

15. An image processing system according to claim 14, wherein said allocation means allocates said bins in accordance with the frequency of use of said image readers.

16. An image processing system according to claim 15, wherein said allocation means allocates said bins vertically arranged downwardly to said image readers whose frequency of use decreases sequentially.

17. An image processing system according to claim 14, wherein said allocation means allocates said bins to said image readers based on the order in which power source of the image readers are turned on.

18. An image processing system according to claim 17, wherein said allocation means allocates said bins vertically arranged downwardly to said image readers whose connection to power source occurs chronologically.

19. An image processing system according to claim 14, wherein said image readers are provided with display means for displaying bins allocated by said allocation means.

20. An image processing system comprising:

a plurality of image readers each of which optically reads images and produces image signals;

printing means for forming images on sheets in accordance with said image signals;

sorting means connected to said printing means, provided with a plurality of discharge paper bins, and adapted to sort sheets on which an image has been printed by said printing means;

allocation means for allocating said discharge paper bins of said sorting means to correspond with each of said image readers in one to one relation; and control means for controlling said sorting means so as to discharge the sheets on which the images have been printed into the discharge paper bin allocated to the image reader which has produced said image signal of the image on the sheet to be discharged.

21. An image processing system comprising:

first and second image readers for optically reading images and producing first and second image signals;

printing means for printing images on sheets in accordance with said first and second image signals;

sorting means connected to said printing means, including a first discharge paper bin corresponding to said first image reader, a second discharge paper bin corresponding to said second image reader, and a plurality of remaining discharge paper bins, and adapted to sort the sheets on which the image has been printed by said printing means;

mode selecting means for selecting a first sorting mode and a second sorting mode; and controlling means for controlling said sorting means so as to respectively discharge, when the first sorting mode is selected by said mode selecting means, the sheet on which the images have been printed in accordance with said first and second image signals into the first and second discharge paper bins, respectively, and so as to discharge, when the second sorting mode is selected by said mode selecting means, the sheets on which the images have been printed into the remaining discharge paper bins.

* * * * *